United States Patent [19]

Williamson

[11] 4,111,232
[45] Sep. 5, 1978

[54] SAFETY MECHANISM FOR PRESSES, MACHINES AND FIXTURES

[76] Inventor: Robert W. Williamson, 77 Cedar Acres, Brunswick, Ga. 31520

[21] Appl. No.: 760,414

[22] Filed: Jan. 18, 1977

Related U.S. Application Data

[60] Continuation of Ser. No. 577,290, May 14, 1975, abandoned, which is a division of Ser. No. 435,900, Jan. 23, 1974, Pat. No. 3,884,336.

[51] Int. Cl.² .................. F16K 1/00; F16K 13/02
[52] U.S. Cl. .................................. 137/882; 137/887
[58] Field of Search ............... 137/82, 608, 614.11, 137/612.1, 882, 887

[56] References Cited

PUBLICATIONS

IBM Technical Disclosure Bulletin, vol. 15, No. 6, Nov. 1972.

*Primary Examiner*—Gerald A. Michalsky
*Attorney, Agent, or Firm*—Harness, dickey & Pierce

[57] ABSTRACT

A safety mechanism including a hand restraint safety mechanism for use by an operator of a machine such as a press, special machine or fixture wherein (absent the present invention) the operator's hands are exposed to the hazard of being caught in the work area of the machine by moving machine elements when the machine is stroked. The hand restraints for the operator's hands are operatively coupled via cables with a fluidic power cylinder mounted in fixed dimensional relation to the machine with which the safety mechanism is used. This restraint cylinder is operative between restraining and released positions to control the length of each cable extended from a housing on which the cylinder is mounted. When the cables are maximally extended, the operator can reach into the machine to load or unload a workpiece. When the cables are minimally extended, the operator's hands are positively removed from the work area of the machine. A safety block mounted on the machine is operatively coupled with a second power cylinder for movement into and out of the work area of the machine. When the safety block is displaced into the machine work area, it mechanically prevents the machine elements from closing should the machine be accidentally stroked. A pneumatic control circuit is operatively coupled with the machine and includes multiple failsafe valves arranged to sense the operating positions of the cylinders and the machine for controlling the operation of the cylinders in a desired fashion. A cycle start signal to the machine is provided only when both the hand restraints and the safety block are retracted from the work area, and the safety block can be retracted only after the hand restraints have been retracted. The operator's hands are thereby maintained safe in a restrained position until the safety block is again extended into the work area after the machine has been stroked. After movement of all elements on the machine has terminated, the hand restraints are released to permit the operator manual access to the machine work area.

10 Claims, 21 Drawing Figures

SAFETY MECHANISM FOR PRESSES, MACHINES AND FIXTURES

This application is a continuation of my application of the same title, Ser. No. 577,290, filed May 14, 1975, now abandoned, which application is a division of my application entitled Safety Mechanism for Presses, Machines, and Fixtures, Ser. No. 435,900, filed Jan. 23, 1974, issued as U.S. Pat. No. 3,884,336 on May 20, 1975.

BACKGROUND AND SUMMARY OF THE INVENTION

The present invention relates to a safety mechanism including hand restraint safety mechanism for use by an operator of a machine having moving machine elements.

Heretofore, various types of hand restraining apparatus of the type to which the present invention relates have been used to remove the machine operator's hands from the path of travel of moving machine elements. In one type of prior hand restraint apparatus, the operator's hands are removed from the danger area as the machine operates. Thus, the operator's hands can still be in the danger area as the machine elements begin to move. A hand restraining safety apparatus which eliminates the above situation by preventing the machine from cycling until the operator's hands are in a safety position remote from the machine is disclosed in copending application of the same inventor for Safety Mechanism for Special Machines and Fixtures, Ser. No. 351,516, filed Apr. 16, 1973 now U.S. Pat. No. 3,847,259. In certain respects the present invention represents an improvement upon the safety apparatus of that earlier filed application.

Accordingly, one important objective of the present invention is to provide a safety mechanism for use by a machine operator wherein not only is movement of elements on the machine prevented until the operator's hands are disposed in a safety position remote from the machine, but also a mechanical safety interlock remains interposed between relatively movable machine elements until the operator's hands are in the safety position. Only after the safety mechanism displaces the operator's hands to the safety position is the mechanical interlock removed and then only with both the mechanical interlock removed and the operator's hands in the safety position is the machine stroked. At the conclusion of the machine stroke the mechanical interlock is reestablished before the hand restraints are released. Hence, a further object of the invention is to provide increased operator safety for the operators of various types of machines such as presses, special machines and fixtures.

The particular details of the present invention by which the foregoing objects are attained include a novel pneumatic control circuit having failsafe valve means operatively associated therewith to sense operating positions of various moving elements of the safety mechanism and the machine with which it is in use. Each failsafe valve means can pass a fluidic signal only when the element whose position is to be sensed is the intended position. By virtue of the unique arrangement of these failsafe valve means in pneumatic circuit, proper sequential operation of the various elements is always assured thereby providing maximum operator safety. In the preferred embodiment of the invention disclosed herein, the particular details of the novel pneumatic control circuit constitute further inventive features of the present disclosure.

One especially important improvement of the present invention involves a novel non-repeat circuit for the safety mechanism which prevents the safety mechanism from being repeatedly operated and the machine from being repeatedly stroked so long as the actuating element for initiating a machine cycle is held in the actuating position. Because of this beneficial feature, accidental cycling, and hence loss of production time, is eliminated.

The foregoing objects and features of the invention along with additional features, advantages and benefits of the invention will be seen in the ensuing description and claims which are to be taken in conjunction with the accompanying drawings. The drawings illustrate a preferred embodiment of the invention in accordance with the best mode presently contemplated for carrying out the invention.

DESCRIPTION OF THE PREFERRED EMBODIMENT

Figures 1, 7:
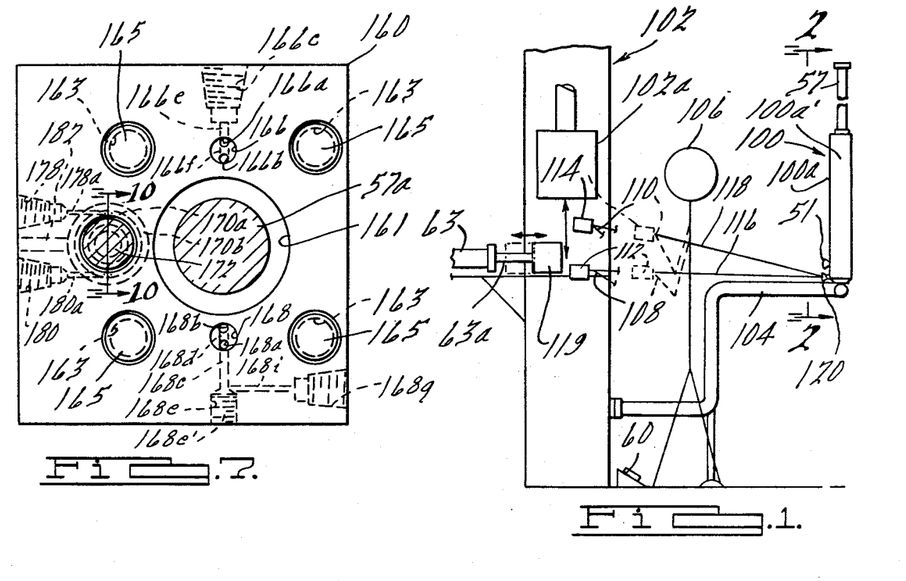
FIG. 1 is a side elevational view of a preferred form of safety mechanism according to the present invention mounted on and operatively coupled with a production machine and illustrating the usage of the present invention by the machine operator.
FIG. 7 is an enlarged sectional view taken along line 7—7 in FIG. 3.
Figures 2, 6, 10:
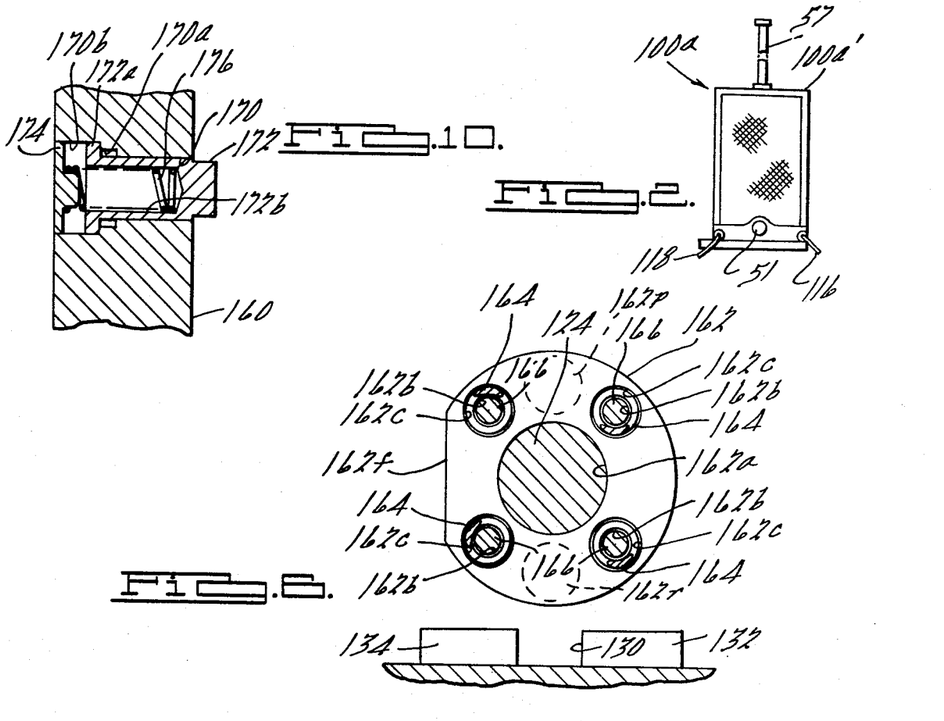
FIG. 2 is a view taken along line 2—2 in FIG. 1.
FIG. 6 is an enlarged sectional view taken along line 6—6 in FIG. 3.
FIG. 10 is an enlarged sectional view taken along line 10—10 in FIG. 7.

FIGS. 1 and 2 illustrate a safety mechanism 100 according to the present invention in use with a production machine 102 having a vertically reciprocally strokeable machine element 102a. Safety mechanism 100 comprises in part a hand restraint safety mechanism 100a contained in a housing 100a' mounted in fixed dimensional relation to machine 102 by means of a mounting structure 104. Sufficient space is provided between housing 100a' and machine 102 to accommodate a machine operator 106. The operator's hands 108 and 110 are respectively engaged with a pair of conventional hand restraints 112 and 114 respectively which are attached to the ends of flexible restraining cables 116 and 118 respectively extending from housing 100a'. The solid line positions of hands 108 and 110 and hand restraints 112 and 114 illustrate hand restraint safety mechanism 100a in the released position. In this position, sufficient lengths of cables 116 and 118 extend from housing 100a' to permit operator 106 to move his hands 108 and 110 into the machine work area for loading and/or unloading a workpiece. Absent the present invention, the operator's hands are exposed to the hazard of being caught by machine element 102a during its stroke. In view of the relatively fast operating speeds of certain types of machines, this can be an extremely hazardous situation. The broken line position of hand restraints 112 and 114 illustrates hand restraint safety mechanism 100a in the restraining position. In this position, sufficient lengths of cables 116 and 118 are drawn into housing 100a' to prevent operator 106 from moving his hands 108 and 110 into the machine work area.

Safety mechanism 100 further includes a mechanical interlock in the form of a safety block 119 mounted on machine 102 and arranged for movement into and out of the path of travel of machine element 102a. Safety block 119 is operatively coupled with the rod 63a of a power cylinder 63 to effect displacement thereof into and out of the machine work area. The size and strength of block 119 are such that when disposed in the path of travel of element 102a (i.e., in the extended or safety position as illustrated by the solid line position in FIG. 1), it will interrupt and limit the downward stroke of element 102a to prevent closure of element 102a on a workpiece should element 102a be stroked for any reason. Further, safety mechanism 100 is arranged such that when block 119 is in the safety position and hand restraint safety mechanism 100a is in the released position, the operator's hands 108 and 110 cannot be displaced far enough to be caught between block 119 and elements 102a. Also, the vertical dimension of block 119 is such that adequate hand clearance is provided between element 102a and the workpiece when element 102a is closed on block 119. Thus, block 110 provides a mechanical safety interlock with machine 102 whereby full closure of machine element 102a can be prevented with block 119 in the safety position. As will be seen in greater detail hereinafter, machine 102 cannot cycle until both the operator's hands 108 and 110, as well as safety block 119, are removed from the path of travel of machine element 102a and one of the inventive features of the present disclosure involves the way in which the operation of various elements of safety mechanism 100 are interlocked with each other and with machine 102.

In order to facilitate the reader's understanding of the ensuing detailed description, it is desirable to summarily describe the operation of safety mechanism 100 in relation to the operation of machine 102. With machine element 102a stopped at its uppermost limit of travel, safety mechanism 100 first operates safety block 119 to the safety position and then hand restraint safety mechanism 100a to the released position. Since cables 116 and 118 are now maximally extended from housing 100a, operator 106 can reach his hands into the work area to load a workpiece into the machine. It will be observed that should element 102a be accidentally stroked with the hand restraint safety mechanism 100a in the released position, that safety block 119 will prevent element 102a from closing on the operator's hands should they be in the work area of the machine. After the workpiece has been loaded, operator 106 actuates a starting device which may be in the form of a foot pedal valve 60 (FIG. 1). Safety mechanism 100, in response to the actuation of valve 60, first operates hand restraint safety mechanism 100a to the restraining position thereby drawing cables 116 and 118 into housing 100a' and positively removing the operator's hands from the machine work area. Only when mechanism 100a is in the restraining position is block 119 removed to its retracted position out of the path of travel of machine element 102a. Now only with both hand restraint safety mechanism 100a in the restraining position and safety block 119 in the retracted position can the machine operating cycle be initiated. During the stroke of machine element 102a, safety mechanism 100 prevents cables 116 and 118 from being extended from housing 100a' and prevents safety block 119 from being shifted to the safety position. Thus, while machine element 102a is moving, the operator's hands and safety block 119 are positively held out of its path of travel. Only after the machine has completed a cycle (that is, only after machine element 102a has been stroked) does safety mechanism 100 operate safety block 119 to the safety position. Only after safety block 119 is at its safety position does hand restraint safety mechanism 100a operate to the released position thereby extending cables 116 and 118 to provide the operator with manual access to the machine work area for unloading the completed workpiece and loading a new workpiece. It will thus be observed that the operator can have manual access to the machine work area only when safety block 119 is at its safety position. Moreover, since the hand restraints are not released until safety block 119 is at its safety position, it will also be noted that manual access to the machine work area cannot occur until movement of all elements on the machine, including safety block 119, has ceased.

Figure 3:
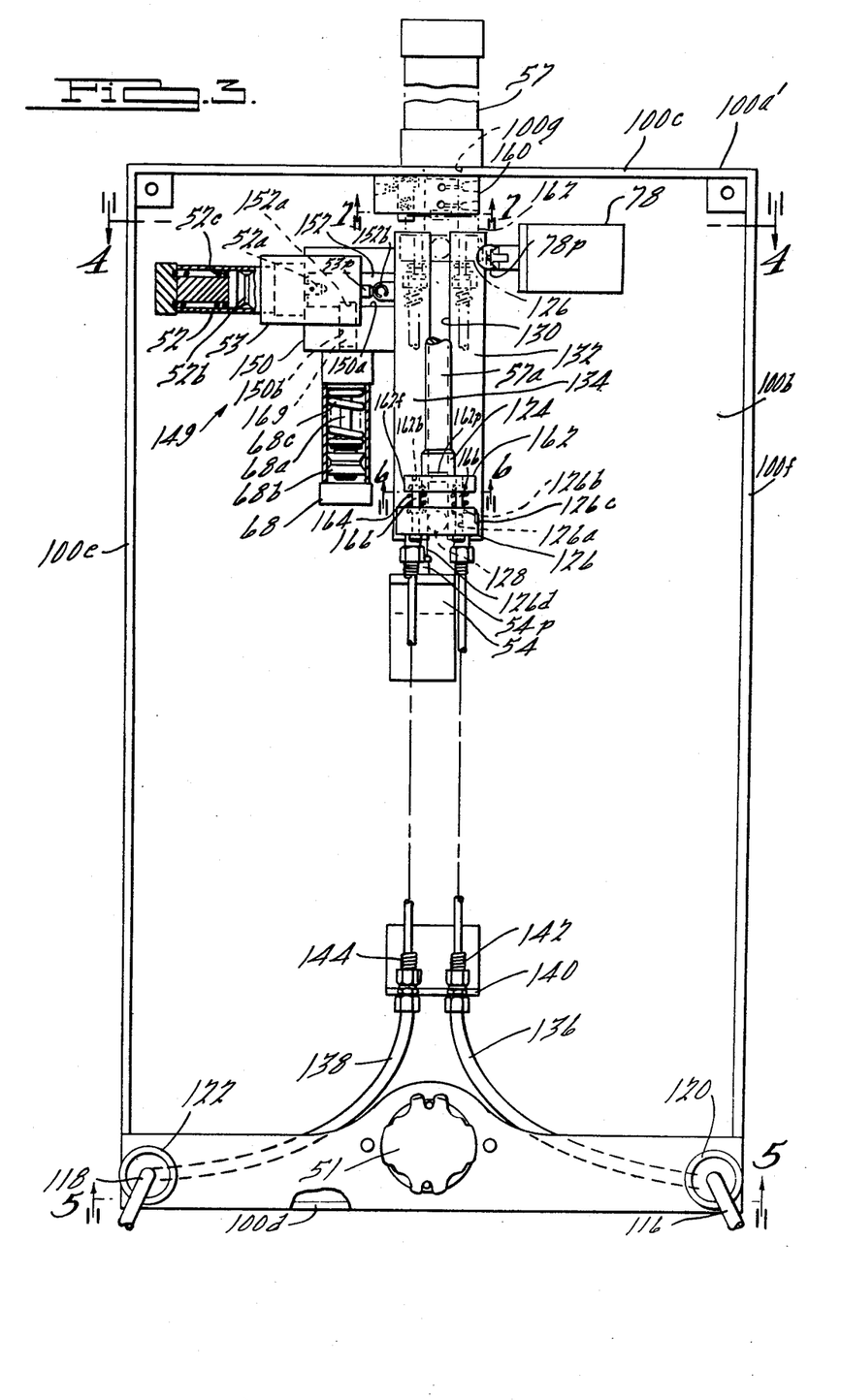
FIG. 3 is an enlarged view of FIG. 2 and having a portion removed.
Figure 4:
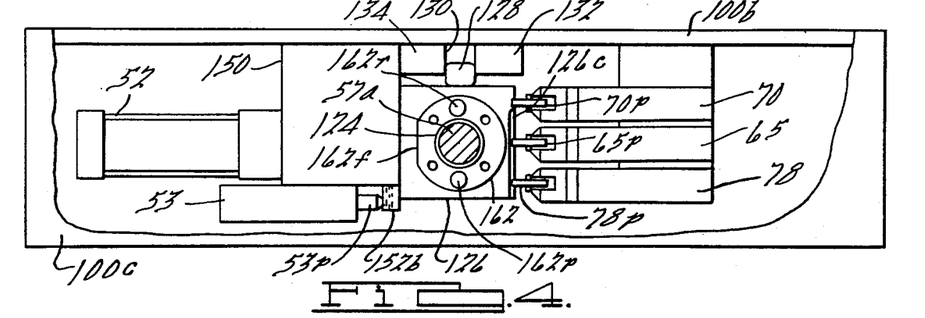
FIG. 4 is an enlarged view taken along line 4—4 in FIG. 3.
Figure 5:
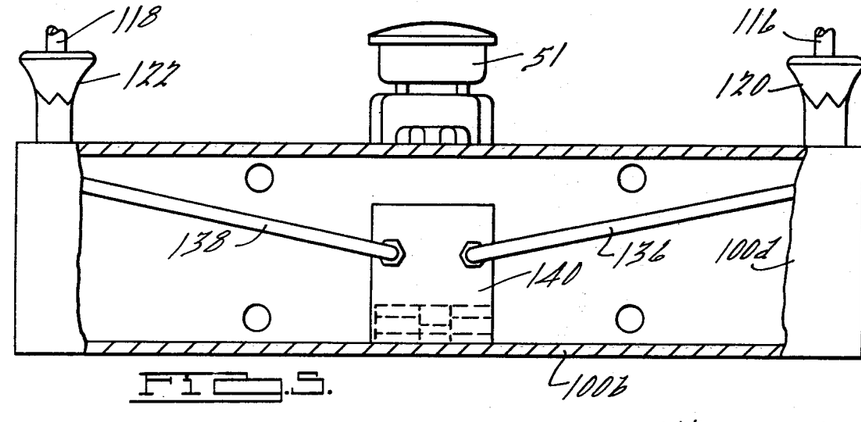
FIG. 5 is an enlarged view taken along line 5—5 in FIG. 3.
Figure 8:
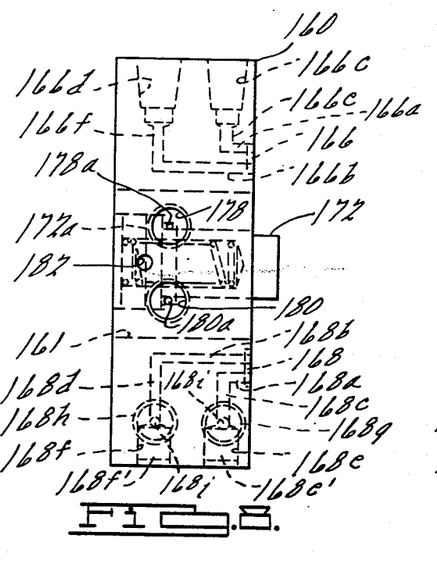
FIG. 8 is a left side elevational view of FIG. 7.
Figure 9:
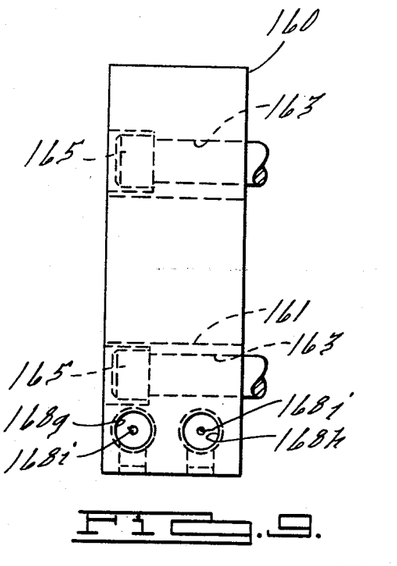
FIG. 9 is a right side elevational view of FIG. 7.

Details of safety mechanism 100 are shown in FIGS. 3–12. Attention is first directed to FIGS. 3–5 showing the sturdily constructed rectangular housing 100a' having a vertical back wall 100b, top and bottom walls 100c, 100d and side walls 100e, 100f. The open interior of housing 100a' is enclosed by a removable cover which has been removed from FIG. 3 to expose the interior construction. Cable guides 120, 122 for guiding cables 116, 118 into and out of housing 100a' are mounted at the lower corners of housing 100a'. A pneumatic cylinder 57, hereinafter referred to as restraint cylinder 57, is centrally mounted on top wall 100c above housing 100a'. A suitable circular opening 100g is provided in top wall 100c through which the rod 57a of restraint cylinder 57 extends into the interior of housing 100a'. Rod 57a also passes through a valve body 160 on the inside of wall 100c, and details of body 160 will be explained later. As best seen in the solid line position of FIG. 3 (which, as will become apparent, represents the released position of the hand restraints), a busing 124 is affixed to the free end of rod 57a, and a cable attaching member 126 in the form of a generally square plate is affixed to bushing 124. A roller 128 is mounted on member 126 and rides in a guideway 130, formed between a pair of guide members 132 and 134 on back wall 100b. A valve member 162 in the form of a generally round plate is mounted on bushing 124 and yieldably coupled with member 126. As will be explained later, valve member 162 is cooperatively associated with valve body 160, this arrangement constituting one of the several embodiments of failsafe valves disclosed herein. As best seen in FIG. 6, valve member 162 is journaled on bushing 124 by a large circular bore 162a to permit member 162 to slide lengthwise thereon. Four smaller threaded bores 162b are arranged 90° apart around bore 162a, and each is counterbored at 162c to receive one end of a coil spring 164. The other end of each coil spring 164 lodges in a corresponding counterbore 126b (FIG. 3) of a corresponding bore 126a in member 126. The threaded shanks of headed guide pins 166 are passed through bores 126a to engage bores 162b and thereby compress springs 164 such that member 162 is yieldably mounted for lengthwise displacement on bushing 124 relative to member 126. A pair of circular pads 162p, 162r (FIG. 6) are affixed to the upper surface of member 162 on opposite sides of bore 162a; as will be seen later, pads 162p, 162r close respective bores in valve body 160 when the safety mechanism is in the restraining position. Note also that the side of member 162 facing wall 100c has a flat 162f.

A pair of cable guiding sleeves 136, 138 extend from cable guides 120, 122, respectively, to a mounting bracket 140 which is affixed to wall 100b in alignment with, but somewhat spaced from cable attaching member 126. Cables 116, 118, upon entering housing 100a' via guides 120, 122, are guided through sleeves 136, 138, respectively, and the ends of the cables are affixed to member 126. Helical springs 142, 144 are disposed around each cable 116, 118, respectively, between member 126 and bracket 140 to assist in guiding the cables. When cylinder rod 57a is extended (solid line position of member 126, etc.), cables 116, 118 are extended from housing 100a' to permit hand restraints 112, 114 to be displaced to the released position. When cylinder rod 57a is retracted (broken line position of member 126), cables 116, 118 are pulled into housing 100a', thereby retracting hand restraints 112, 114, and hence the operator's hands, to the restraining position. During operation of cylinder 57, roller 128 guides member 126 along guideway 130. It will be observed that with the safety mechanism 100a in the restraining position, valve member 162 has been displaced on bushing 124 toward member 126 because of abutment with valve body 160 via the plastic pads 162p, 162r. Valve member 162 and valve body 160 are arranged in relation to the stroke of cylinder rod 57a such that pads 162p, 162r abut the lower surface of body 160 prior to cylinder rod 57a arriving at the retracted position. Thus, after pads 162p, 162r abut body 160 to arrest further travel of member 162 relative thereto, cylinder rod 57a continues along a final increment of travel toward the retracted position while member 162 is increasingly displaced on bushing 124 toward member 126 against the spring force of springs 164 with member 126 continuing to move with cylinder rod 57a over the final increment of travel toward the retracted position. When cylinder rod 57a is extended from the retracted position, member 162 initially remains in abutment with valve body 160 until member 126 has been extended to abut the heads of guide pins 166 after which member 162 also begins to move with cylinder rod 57a away from valve body 160.

A plurality of four valves, 54, 65, 70 and 78 are mounted on wall 100b for actuation in accordance with the position to which member 126 is operated by cylinder 57. Valve 54 has a plunger 54p positioned for actuation by the head of a stud 126d threaded into a tapped hole in the bottom surface of member 126; valve 54 being disposed for operation to its actuated, or tripped, position when cylinder rod 57a is fully extended (i.e., hand restraints in the released position) and stud 126d provides a convenient adjustment for attaining this result. Valves 65, 70 and 78 are stacked (FIG. 4) and have their roller-type plungers 65p, 70p and 78p positioned for actuation by member 126. A cam surface 126c is fashioned along a portion of the upper side edge of member 126 so that plunger 70p is actuated slightly before plungers 65p and 78p as member 126 approaches the restraining position. Thus valves 65, 70 and 78 are actuated when cylinder rod 57a is fully retracted (i.e., hand restraints in the restraining position), but with valve 70 being actuated slightly before valves 65 and 78 as the cylinder rod retracts. A valve 83 (shown only in FIG. 11) is positioned adjacent valve 54 for actuation by member 126 when the latter is in the released (i.e., illustrated) position. A palm-button operated reset valve 51 is mounted on housing 100a' between cable guides 120, 122. Details of the pneumatic circuit arrangement of the above valves will be covered in the description of FIG. 11.

A low air pressure safety interlock 149 (see FIG. 3) mechanically restricts the travel of cylinder rod 57a when the system supply line air pressure drops below a predetermined level. By way of example, this may occur when a nominal pressure of 80 psi drops below 60–65 psi. A rectangular block 150 is affixed to wall 100b alongside the top end of guide 134. A guideway 150a is fashioned in block 150 at a right angle to the travel of cylinder rod 57a. A second guideway 150b is fashioned in block 150 to intercept guideway 150a at a right angle. A slide 152 is guided in guideway 150a and is shiftable lengthwise of the guideway into and out of the path of travel of member 126 by means of a pneumatic cylinder 52. Cylinder 52 has a cylinder rod 52a connected to a piston 52b and the latter is engaged by a coil spring 52c such that rod 52a, and hence slide 152, are urged to the extended position. (The drawing, however, illustrates cylinder 52 and slide 152 in the retracted position.) In the retracted position, slide 152 clears the path of travel of member 126, thereby permitting the latter to freely move between the released and restraining positions when cylinder 57 is operated. However, when cylinder rod 52a is fully extended, slide 152 is disposed within the path of travel of member 126, thereby restricting the travel of the latter. Thus, if member 126 is in the restraining (broken line) position (of FIG. 3) when cylinder 52 moves slide 152 into the path of travel of member 126, then it is impossible for cylinder rod 57a to be fully extending and thus hand restraints 112, 114 cannot be moved to the released position. If member 126 is in the released position when slide 152 is shifted into the path of travel of member 126, then member 126 cannot be brought to the restraining position, and as will be seen later, machine element 102a cannot be stroked. Note that with slide 152a extended, member 162 does not hit the slide because of the clearance provided by flat 162f. Another cylinder 68 is mounted on block 150 in alignment with guideway 150b. A slide 169 is affixed to the cylinder rod 68a of cylinder 68, and is guided in guideway 150b. A coil spring 68c biases the piston 68b of cylinder 68 to urge cylinder rod 68a, and hence slide 169, toward the retracted position. (The drawing, however, illustrates cylinder 68 and slide 169 in the latched position.) With cylinder rod 68a in the retracted position, the end of slide 169 clears guideway 150a. However, when sufficient air pressure is introduced into the head end of cylinder 68, the bias of spring 68c is sufficiently overcome to move slide 169 into guideway 150a. With cylinder rod 52a retracted, slide 169 latches in a groove 152a fashioned in the side of slide 152. As long as sufficient air pressure continues to be supplied to cylinder 68, the latching engagement of slide 169 with groove 152a is maintained to hold slide 152 clear of the path of travel of member 126. However, when the supply line pressure drops below a predetermined level, the force of spring 68c is sufficient to remove slide 169 from groove 152a and when this happens, spring 52c urges slide 152 into the path of travel of member 126. This condition remains until the system is reset and sufficient air supply pressure again exists. This aspect along with the way in which cylinders 52 and 68 are connected in the pneumatic control circuit will be explained in greater detail in connection with the description of FIG. 11. A pilot supply valve 53 is mounted on block 150 and has its plunger 53p actuated by a pin 152b on slide 152 when the latter is out of the path of travel of member 126. The connection of valve 53 in circuit will also be covered in the description of FIG. 11.

In accordance with important features of the present arrangement, a failsafe circuit is provided whereby it is impossible for machine 102 to be stroked when the hand restraints are in other than the restraining position, and the safety block in other than the retracted position. This failsafe circuit is embodied in part by the construction details of valve body 160. Therefore, attention is directed to FIGS. 7–10 which illustrate these details. Body 160 is of generally square shape and mounted on the inside of top wall 100c in general alignment with cylinder 57. Valve body 160 comprises a large circular hole 161 aligned with hole 100g in the housing top wall (FIG. 3). Rod 57a passes through hole 161, and hole 161 is large enough to accommodate bushing 124 when cylinder rod 57a is retracted. Suitable holes 163 are arranged around hole 161 and suitable fasteners 165 are passed through these holes and matching holes in wall 100c and in the mounting flange of cylinder 57 whereby both cylinder 57 and body 160 are mounted to wall 100c. A pair of shallow bores 166, 168 are fashioned in the surface of member 160 which faces member 162, and are on diametrically opposite sides of hole 161. A pair of small, thin passages 166a, 166b extend upwardly through member 160 from the interior end of bore 166. A pair of holes 166c and 166d for reception of pneumatic line fittings are fashioned in one side of body 160 at right angles to passages 166a, 166b. A small, thin passage 166e extends into body 160 from the interior end of hole 166c to intercept the interior end of passage 166a. A small, thin passage 166f extends from the interior end of hole 166d to intercept the interior end of passage 166b. In similar fashion, a pair of small, thin passages 168a and 168b extend into block 160 from the interior end of bore 168. These two passages are intercepted by passages 168c and 168d, which latter passages extend from the interior ends of holes 168e and 168f formed in the side of member 160 opposite holes 166c and 166d. In order to effect connection of pneumatic line fittings at the side of member 160 which faces wall 100f, a pair of holes 168g and 168h are fashioned therein and small, thin passages 168i and 168j extend from the interior ends of these latter two holes to intercept passages 168c and 168d. Holes 168e and 168f are plugged by plugs 168e' and 168f'. As mentioned earlier, valve member 162 is cooperatively associated with valve body 160. When valve member 162 abuts valve body 160, pads 162p, 162r close on bores 166 and 168 respectively. With bore 166 closed by pad 162p, a pneumatic fluid path, through which a fluidic signal can pass, is created between hole 166c and hole 166d via passages 166e, 166a, bore 166, and passages 166b and 166f; and with bore 168 closed by pad 162r, a pneumatic fluid path, through which a fluidic signal can pass, is created between hole 168g and hole 168h via passages 168i, 168c, 168a, bore 168, and passages 168b, 168d and 168j. Thus these constructions provide a pair of failsafe valves available for connection in pneumatic circuit. As will be seen in FIG. 11, only one of these valves is utilized and is identified by the numeral 66 in that Figure. The fluid path through each valve such as 66 is created immediately upon abutment of valve member 162 with body 160; since member 162 is yieldably mounted on member 126, valve 66 can conduct a fluidic signal as member 126 moves over its final increment of travel to the restraining position.

As will be seen later, other failsafe valves (such as valve 83 mentioned earlier) are used in the present invention. All such failsafe valves are functionally identical to failsafe valve 66; that is, only when an actuating member closes the open bore of the failsafe valve (such as member 162 closing on bore 166 in valve 66) is a fluid path created through which a fluidic signal can be transmitted.

Figure 11:
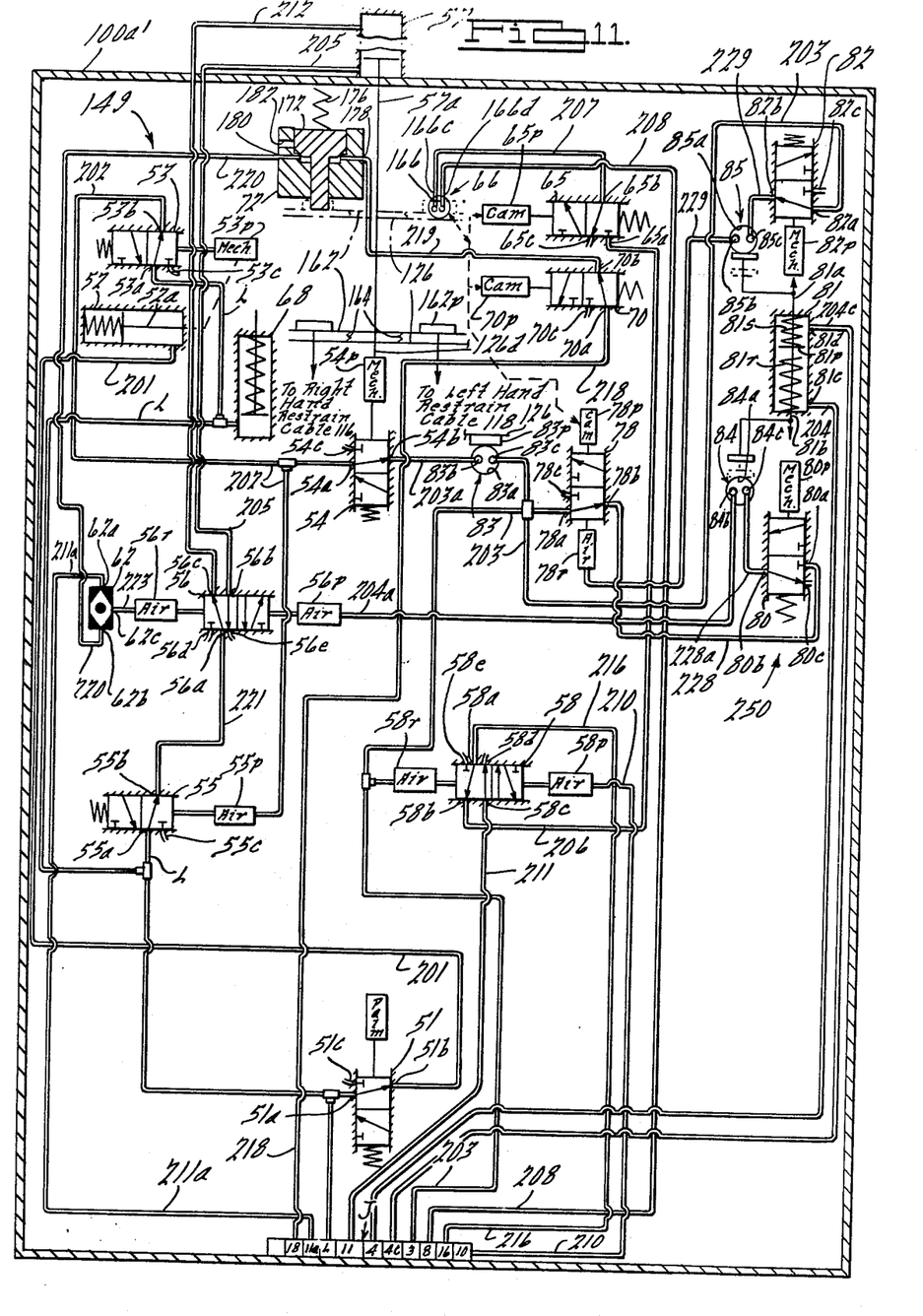
FIG. 11 is a schematic diagram of a portion of the pneumatic control circuit of the safety mechanism of FIG. 1.

Body 160 is also constructed to provide a three-way, exhaust valve which is identified by the numeral 72 in FIG. 11. As will be later seen in FIG. 11, valve 72 forms a portion of an emergency release circuit. A bore 170 extends vertically through body 160 at one side thereof and the upper end thereof is doubly counterbored as at 170a and 170b. A valving member 172 is slidably arranged within bore 170 and comprises a circular head 172a which fits snugly within counterbore 170b. One end of a spring 176 is contained within the bore 172b of member 172 and the other end of the spring bears against a cap 174 inserted into counterbore 170b so that spring 176 thereby biases member 172 to the illustrated position. In this position, head 172a abuts the shoulder between counterbores 170a and 170b and the lower end of member 172 protrudes from the bottom surface of member 160. A pair of holes, or ports, 178 and 180 for connection to pneumatic line fittings are fashioned in the side of member 160 facing wall 100e and small, thin passages 178a, 180a, respectively, extend from the interior ends thereof to intercept counterbore 170a. An exhaust passage 182 (FIGS. 7 and 8) is fashioned in member 160 to intercept counterbore 170b. In the illustrated position a pneumatic fluid path exists between holes 178 and 180. As will be seen in greater detail herein, in connection with the description of FIG. 11, when valve member 172 is displaced upwardly (i.e., to the left in FIGS. 8 and 10), the path between holes 178 and 180 is interrupted by being vented to exhaust via passage 182.

Figure 12:
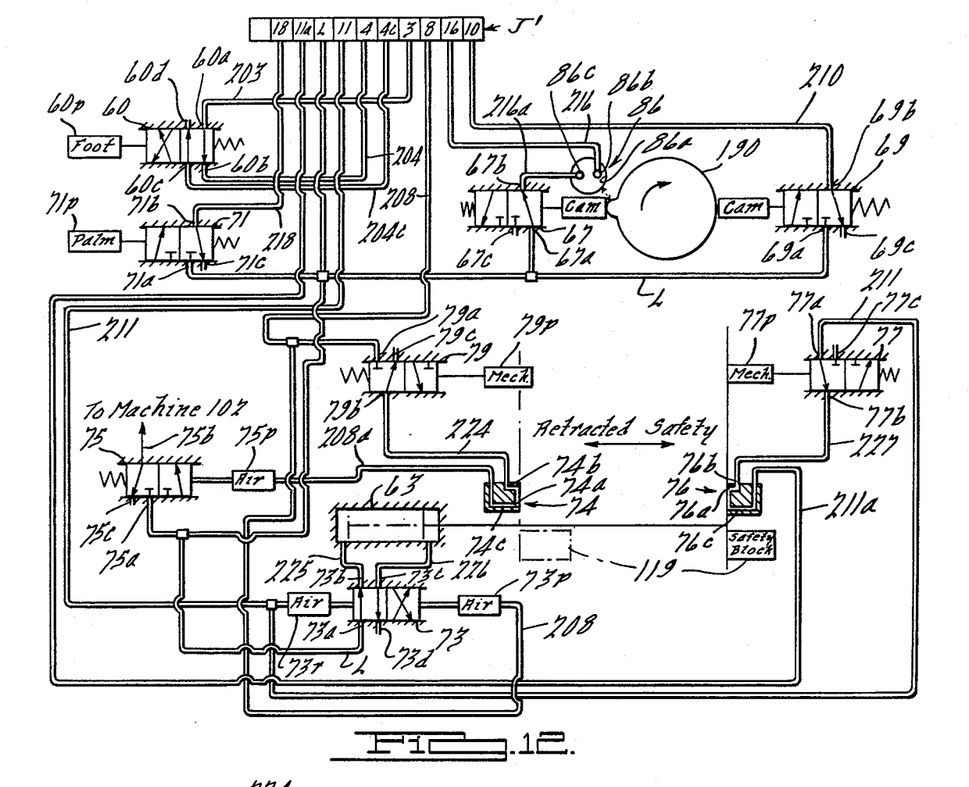
FIG. 12 is a schematic diagram of the remainder of the pneumatic control circuit of the safety mechanism of FIG. 1 and is to be taken in conjunction with FIG. 11.

The schematic diagram of the pneumatic control circuit of safety mechanism 100 is shown in FIGS. 11 and 12. FIG. 11 schematically illustrates the arrangement of the pneumatic circuit components which are contained within housing 100a' while FIG. 12 illustrates the remaining components, which are exterior of housing 100a'. Since various pneumatic circuit components within housing 100a' must be operatively coupled with various components exterior of housing 100a', certain pneumatic lines must be routed both interior of and exterior of housing 100a'. Such routing is effected via a junction J (FIG. 11) which mates with a mating junction J' (FIG. 12). The connection of similarly numbered pneumatic lines in FIGS. 11 and 12 are via similarly numbered connections at each junction. For example, connection 3 of junction J mates with connection 3 of junction J' to couple the portion of line 203 in FIG. 11 with the portion of line 203 in FIG. 12.

The portion of the circuit in FIG. 11 comprises the following circuit components: reset valve 51 (mentioned earlier in FIGS. 3 and 5), which is a two-position, three-way, spring-returned, palm-operated, normally closed type; the low air pressure safety interlock 149 (described earlier) which is composed of cylinder 52, pilot supply valve 53, which is a two-position, three-way, spring-returned, mechanically-actuated type, and cylinder 68; control valve 54 (mentioned earlier in FIG. 3), which is a two-position three-way, spring-returned, mechanically-actuated type; a supply valve 55, which is a two-position, three-way, spring-returned, air-actuated type; a master valve 56, which is a two-position, four-way, five-ported, air-returned, air-actuated type; a pilot valve 58 which is a two-position, four-way, five-ported, air-returned, air-actuated type; a shuttle valve 62, which is a shuttle type; cam valve 65 (mentioned earlier in FIGS. 3 and 4), which is a two-position, three-way, spring-returned, cam-actuated type; failsafe valve 66 (mentioned earlier in FIGS. 7–10); cam valve 70 (mentioned earlier in FIGS. 3 and 4) which is a two-position, three-way, spring-returned, cam-actuated, normally open type; exhaust valve 72 (described earlier in FIGS. 7–10); a pilot valve 78 (mentioned earlier in FIGS. 3 and 4) which is a two-position, three-way, cam-actuated, air-returned type; a pilot valve 80, which is a two-position, three-way, mechanically-actuated, spring-returned type; a pilot valve 82, which is a two-position, three-way, mechanically-actuated, spring-returned type; a failsafe valve 83, which is functionally equivalent to failsafe valve 66; a failsafe valve 84, which is functionally equivalent to failsafe valve 66; a failsafe valve 85, which is functionally equivalent to failsafe valve 66; and a pilot cylinder 81 which, as will be explained in greater detail hereinafter, is operatively associated with valves 78, 80, 82, 84, and 85 in the pneumatic circuit to constitute a non-repeat circuit 250. While valves 55, 56, 58, 80, 82, 83, 84, 85 and cylinder 81 are contained in housing 100a', they, along with the various pneumatic lines interconnecting the valves have been omitted for sake of clarity in FIG. 3 and related mechanical drawing figures.

In FIG. 12 the remainder of the circuit is seen to comprise the following components: foot pedal valve 60 (mentioned earlier in FIG. 1), which is a two-position, four-way, spring-returned, foot-actuated type; a cam valve 67, which is a two-position, three-way, spring-returned, cam-actuated, normally closed type; a cam valve 69, which is a two-position, three-way, spring-returned, cam-actuated, normally closed type; an emergency valve 71 which is a two-position, three-way, spring-returned, palm-actuated, normally closed type; a master valve 73, which is a two-position, four-way, air-actuated, air-returned type; a failsafe valve 74, which is functionally equivalent to failsafe valve 66; a pilot valve 75, which is a two-position, three-way, air-actuated, spring-returned type; a failsafe valve 76, which is functionally equivalent to failsafe valve 66; a pilot valve 77, which is a two-position, three-way, mechanically-actuated, spring-returned type; a pilot valve 79, which is a two-position, three-way, mechanically-actuated, spring-returned type; a failsafe valve 86, which is functionally equivalent to failsafe valve 66; and cylinder 63 (mentioned earlier in FIG. 1) for operating safety block 119.

In the ensuing description, all valves are selectively operable between an actuated position and a released (or returned) position. For mechanically-actuated, cam-actuated or air-actuated, spring-returned valves, the actuated position thereof refers to that position where the valve actuator is displaced against the bias of its spring, and the released position refers to the valve position to which the valve actuator is normally biased by the spring. All air-actuated or cam-actuated, air-return valves are illustrated in the returned position. For failsafe valves 66, 74, 76, 83, 84, 85 and 86, the actuated position refers to that position of the valve wherein the valve can conduct a fluidic signal. For valve 72, the actuated position refers to the position where it vents to exhaust. FIGS. 11 and 12 illustrate the safety mechanism in the following condition: cylinder 57a fully extended (i.e., hand restraints released); foot pedal valve 60 released; cylinder 63 fully extended (i.e., safety block 119 in the safety position); and the low air pressure safety interlock 149 reset. Machine element 102a is stopped at its upper limit of travel.

Looking now at the detailed circuit arrangement of the above components, valves 67, 69 and 86 (FIG. 12) are arranged for actuation in predetermined relation to the stroke of machine element 102a. Valves 67 and 86 are pneumatically coupled in series by a pneumatic line 216a to transmit a fluidic signal only when machine element 102a is at its upper limit of travel (i.e., at top dead center or ram-up position); valve 69 is arranged to transmit a fluidic signal only when element 102a is at its lower limit of travel (i.e., bottom dead center). More specifically, the system air supply line L connects to inlet 67a of valve 67 and to inlet 69a of valve 69. Outlet 67b of valve 67 connects via line 216a to port 86c of valve 86, and port 86b of valve 86 connects via line 216 to the inlet 58a of valve 58 in FIG. 11. Port 67c of valve 67 vents to exhaust. Outlet 69b of valve 69 connects via line 210 to the air actuating pilot 58p of valve 58. Proper valve actuation is attained by an operative coupling with machine 102. This operative coupling may be with any element (or elements) of machine 102 so long as valves 67 and 86 are operated to their actuated positions when machine element 102a is at top dead center and valve 69 is operated to its actuated position some time during the stroke of element 102a (for example, when element 102a is at bottom dead center). One possible way of actuating valves 67 and 69 is via a rotary cam 190 which rotates in synchronism with the stroke of machine element 102a, making one revolution for each stroke (one revolution constituting a downstroke and an upstroke). When machine element 102a comes to bottom dead center, valve 69 is actuated by cam 190 to transmit air to pilot 58p. Only when machine element 102a is at top dead center or rest is valve 67 actuated (as illustrated in the drawing) by cam 190 to transmit air to port 86c of failsafe valve 86. The open bore 86a of valve 86 is closed by another cam actuator (not shown in FIG. 12) as element 102a completes a final increment of its upstroke. (The particular construction details of valve 86 will be explained later in FIGS. 13 and 14.) Hence, as element 102a completes its upstroke, valve 86 is actuated just prior to valve 67 so that air is transmitted through the two valves to inlet 58a of valve 58 only after element 102a has arrived at top dead center. It is desirable and beneficial to actuate valve 86 slightly before valve 67 so that the cam actuator for valve 86 does not have to close against the force of a jet of air being exhausted through bore 86a which would be the case if valve 67 were actuated first. Thus, valves 67 and 86 constitute a failsafe circuit for sensing when element 102a is at top dead center.

Valves 73, 74, 76, 77 and 79 (FIG. 12) are operatively associated with the mechanical safety interlock provided by block 119 and cylinder 63. Valve 73 is arranged to control the extension and retraction of cylinder rod 63a to which block 119 is affixed. The system air supply line L connects to the inlet 73a of valve 73 while the outlet 73b of the valve connects via line 225 to the head end of cylinder 63. The rod end of cylinder 63 connects via line 226 to port 73c of the valve and port 73d vents to exhaust. The return pilot 73r of valve 73 connects via line 211 with port 58c of valve 58 in FIG. 11. The actuating pilot 73p of valve 73 connects via line 208 with port 166d of failsafe valve 66 in FIG. 11. With valve 73 in the return position as illustrated in the drawing, valve 73 supplies air to the head end of cylinder 63 and vents the rod end thereof, whereby cylinder rod 63a is extended to move safety block 119 to the safety position. When valve 73 is in the actuated position, it supplies air to the rod end of cylinder 63 and vents the head end thereof, whereby cylinder rod 63a is retracted to return safety block 119 to the retracted position. Valves 76 and 77 are connected in series and constitute a failsafe circuit for sensing when safety block 119 is in the safety position. In similar fashion, valves 74 and 79 are connected in series and constitute a failsafe circuit for sensing when safety blok 119 is in the retracted position. More specifically, line 211 connects to inlet 77a of valve 77; outlet 77b of valve 77 connects via line 227 to port 76b of valve 76; port 76c of valve 76 connects via line 211a to inlet 62a of shuttle valve 62 in FIG. 11. When safety block 119 is in the safety position as illustrated in the drawing, an actuating arrangement which is movable with cylinder rod 63, and is only schematically illustrated in FIG. 12, actuates valve 76 by closing the open bore 76a thereof and actuates valve 77 via the actuator 77p thereof. Desirably, valve 76 is arranged for actuation just prior to actuation of valve 77 as safety block 119 approaches the safety position. Thus, when safety block 119 is at the safety position, air can be conducted through valves 77 and 76 to inlet 62a of shuttle valve 62. In similar fashion, when safety block 119 is retracted, the actuating arrangement on cylinder rod 63a now actuates valve 74 by closing the bore 74a thereof and valve 79 by operating the actuator 79p thereof. Preferably, valve 74 is actuated just prior to valve 79. Thus, with safety block 119 in the retracted position, air can be conducted from port 166d of valve 66 in FIG. 11 through valves 74 and 79 to pilot 75p of valve 75. Supply line L connects to inlet 75a of valve 75 and outlet 75b to machine 102. Thus, when valve 75 is actuated, a signal is transmitted therethrough to machine 102, and this signal is used to initiate a stroke of element 102a.

Still considering FIG. 12, line 203 connects inlet 60a of valve 60 with port 83c of valve 83 in FIG. 11; ports 60b and 60c of valve 60 connect via lines 204 and 204c, respectively, with non-repeat circuit 250 in FIG. 11; port 60d vents to exhaust. In the illustrated released position of valve 60, it can transmit air from port 83c of valve 83 to port 81c of cylinder 81 while venting the other port 81d of cylinder 81 to exhaust. When valve 60 is actuated, it can transmit air from port 83c to port 81d while venting port 81c to exhaust. Valve 71 is utilized in the emergency release circuit mentioned before and its circuit connection and operation will be explained later when the emergency release circuit is described.

Turning now to details of FIG. 11 and first to non-repeat circuit 250, cylinder 81 comprises a piston 81p which, when equal pressure exist at ports 81c and 81d, is biased to the center of the cylinder by a pair of springs 81r and 81s which bear against opposite sides of piston 81p within the cylinder. When pressure is supplied to port 81c and not to port 81d as illustrated in the drawing, piston 81p is displaced upwardly against the bias of spring 81s. An actuator 81a at the upper end of the cylinder is movable with piston 81p and is arranged to actuate valves 82 and 85 when piston 81p is displaced upwardly within the cylinder. When pressure is supplied to port 81d and not to port 81c, piston 81p is displaced downwardly against the bias of spring 81r. In this position, an actuator 81b at the lower end of the cylinder actuates valves 80 and 84.

Valves 82 and 85 are connected in series and constitute a failsafe circuit for sensing when piston 81p is displaced upwardly within cylinder 81. More specifically, the inlet 82a of valve 82 connects via line 203 to port 83c of valve 83; outlet 82b of valve 82 connects to port 85c of valve 85; port 85b of valve 85 connects via line 229 to the return pilot 78r of valve 78; and port 82c of valve 82 vents to exhaust. With piston 81p displaced upwardly within cylinder 81 (as illustrated) actuating arrangement 81a closes the bore 85a of valve 85 and actuates valve 82 via the actuator 82p thereof. Desirably, valve 85 is actuated just before valve 82 as piston 81p is displaced upwardly. Thus, with piston 81p displaced fully upwardly within cylinder 81, valves 82 and 85 can transmit air from valve 83 to pilot 78r of valve 78. In similar fashion, valves 80 and 84 are connected in series and constitute a failsafe circuit for sensing when piston 81p is displaced downwardly within cylinder 81. In particular, outlet 78b of valve 78 connects via line 228 to inlet 80a of valve 80; outlet 80b of valve 80 connects via line 228a to port 84c of valve 84; port 84b of valve 84 connects via line 204a to the air-actuating pilot 56p of valve 56; and port 80c of valve 80 vents to exhaust. Inlet 78a of valve 78 connects via line 203 with port 83c of valve 83 and the port 78c of valve 78 vents to exhaust. When piston 81p is displaced downwardly within cylinder 81, actuating arrangement 81b closes the bore 84a of valve 84 and actuates valve 80 via the actuator 80p thereof. Desirably, valve 84 is actuated just before valve 80 as piston 81p is displaced downwardly. Thus, with valve 78 in its return position, as illustrated, valves 80 and 84 can transmit air from valve 83 to pilot 56p when piston 81p is displaced fully downwardly within cylinder 81. As will be explained more detailedly hereinafter, non-repeat circuit 250 prevents the safety mechanism and the machine from executing more than a single cycle at a time by requiring foot pedal valve 60 to be released and then actuated before a subsequent cycle can occur.

Considering still further details of FIG. 11, reset valve 51 is provided to reset the safety mechanism at the beginning of the operating sequence if resetting is required. The system air supply line L is connected to the inlet 51a of valve 51 and outlet 51b of valve 51 is coupled via a pneumatic line 201 with the rod end of cylinder 52. With this arrangement, when valve 51 is operated to the actuated position (as illustrated), it opens to supply air to cylinder 52 thereby displacing cylinder rod 52a (FIG. 3) to the retracted position and hence moving slide 152 out of the path of travel of member 126. Supply line L is also directly connected to the head end of cylinder 68. So long as sufficient line air pressure is available, cylinder 68 is extended to latch slide 169 in groove 152a to lock cylinder rod 52a in the retracted position, and hold slide 152 out of the path of travel of member 126. This condition is maintained after valve 51 is released to its return position only so long as sufficient line pressure exists. When the line pressure drops below a predetermined minimum, slide 169 unlatches slide 152 thereby permitting the latter to be disposed in the path of travel of member 126. Hence, a safety is provided in the event of loss of system pressure.

Supply line L also connects to inlet 53a of valve 53 and the outlet 53b of valve 53 connects via line 202 to pilot 55p of valve 55. Outlet 53c of valve 53 vents to exhaust. As will be remembered from earlier description, since valve 53 is actuated when low air pressure safety circuit 149 is reset, valve 53 supplies air to inlet 54a and pilot 55p so long as the line air pressure remains above the predetermined minimum. Line L also connects to inlet 55a of valve 55, and with pilot 55p being actuated, valve 55 transmits air to valve 56 via line 221 which connects between outlet 55b of valve 55 and inlet 56a of valve 56. Thus, so long as the system air pressure is above the predetermined minimum, air is always supplied to inlet 56a. Outlet 56b of valve 56 connects via line 205 to the rod end of cylinder 57 and the head end of cylinder 57 connects via line 212 with port 56c of valve 56. Ports 56d and 56e of valve 56 vent to exhaust. With this arrangement, when valve 56 is in the return position as illustrated in the drawing, it transmits air to the head end of cylinder 57 and vents the rod end thereof to exhaust whereby cylinder rod 57a is extended. When valve 56 is in the actuated position, it transmits air to the rod end of cylinder 57 and vents the head end thereof to exhaust, whereby cylinder 57a is retracted. As will be seen later, valve 56 is operated to the actuated position in response to air supplied via line 204a from non-repeat circuit 250 and to the return position via air supplied to pilot 56r through shuttle valve 62 from the safety block circuit.

Line 202 also connects to inlet 54a of valve 54. The outlet 54b of valve 54 connects to port 83b of valve 83, while port 54c of valve 54 vents to exhaust. Valves 54 and 83 are connected in series and constitute a failsafe circuit for sensing when cylinder rod 57a is fully extended and hence, sensing when the hand restraints are in the released position. Thus, when valve 54 is actuated by actuator 126 and the bore 83a of valve 83 is closed by pad 83p, air is transmitted through the two valves to those circuit components which are commonly connected via line 203 to port 83c. Preferably, valve 83 is actuated just before valve 54 as cylinder rod 57a approaches the extended position.

In addition to the connections to valve 58 which have already been enumerated, outlet 58b of valve 58 connects via line 206 to inlet 65a of valve 65. Ports 58d and 58e vent to exhaust. Outlet 65b of valve 65 connects via line 207 to port 166c of valve 66. Thus, valves 65 and 66 are connected in series and constitute a failsafe circuit for sensing when cylinder rod 57a is fully retracted and hence, sensing when the hand restraints are in the restraining position. Because of the yieldable connection of member 162 on member 126, bore 166 is closed by pad 162p just prior to the actuation of valve 65 by member 126. Thus, when the hand restraints are fully retracted, a signal from valve 58 can be transmitted through valves 65 and 66 to valve 73. Valve 78 is also actuated by member 126 when cylinder rod 57a is fully retracted.

In light of the foregoing detailed description of the various portions of FIGS. 11 and 12, the overall operation of the safety mechanism can now be fully appreciated. First, if necessary, valve 51 is actuated to reset circuit 149. Safety block 119 is in the safety position and the hand restraint safety mechanism 100a is in the released position. After operator 106 has loaded a workpiece into machine 102, he actuates valve 60. This causes piston 81p to be displaced downwardly within cylinder 81, thereby actuating valves 80 and 84. Since valves 54 and 83 are presently all actuated, the actuation of valves 80 and 84 causes air to be supplied to pilot 56p of valve 56, thereby operating this latter valve to the actuated position. Cylinder 57 now begins to retract, thereby operating hand restraint safety mechanism 100a to the restraining position.

As cable attaching member 126 retracts, it releases valves 54 and 83. Accordingly, port 81d of cylinder 81 vents to exhaust and springs 81s and 81r center piston 81p within cylinder 81 whereby all four valves 80, 82, 84 and 85 are now released. Note also that pilot 56p now vents to exhaust.

When member 126 is fully retracted, valves 65 and 66 are actuated to cause the air which is presently being transmitted through valve 67, valve 86 and valve 58 to the inlet 65a of valve 65 to be further transmitted through valves 65 and 66 to pilot 73p of valve 73. Since pilot 73r is presently being vented through valve 58, valve 73 operates to the actuated position to thereby retract safety block 119 from the safety position to the retracted position. From this operating arrangement, it will be observed that the hand restraint must be in the retracted position before safety block 119 can be retracted from its safety position and failsafe operation is attained via the failsafe circuit of valves 65 and 66. As block 119 begins to retract from the safety position, valves 76 and 77 are released. Release of these valves vents inlet 62a of valve 62 to exhaust so that it now becomes impossible for valve 56 to extend cylinder rod 57a. Hence, so long as safety block 119 is away from its safety position, the operator is prevented by the hand restraint mechanism from having manual access to the work area of the machine. When safety block 119 is fully retracted, valves 74 and 79 are actuated. The air signal from valve 66 is now transmitted through valve 79 and valve 74 to actuate valve 75 and supply a signal to machine 102 for initiating the stroke of element 102a. Note that because of the failsafe circuit constituted by valves 74 and 79 which is in series with the failsafe circuit constituted by valves 65 and 66, both the hand restraints and the safety block must be in the retracted positions before machine element 102a can stroke. Thus, optimum safety is ensured.

As machine element 102a begins its downstroke, valve 67 is released and this removes air from all circuits which are supplied from it, venting these to exhaust. However, nothing else happens immediately. When valve 69 is actuated, pilot 58p is energized, thereby actuating valve 58, pilot 58r having been previously vented to exhaust. Valve 67 is again actuated at the conclusion of the stroke of element 102a so that air is then supplied through valve 58 to pilot 73r of valve 73. Valve 73 now operates to the return position to extend cylinder 63 and thereby shift safety block 119 to the safety position. As safety block 119 advances toward the safety position, valves 74 and 79 are released, whereby it becomes impossible to actuate valve 75. When safety block 119 arrives at the safety position, valves 77 and 76 are actuated to conduct the signal being supplied through valves 67 and 58 to inlet 62a of shuttle valve 62 and hence to operate valve 56 to the return position since, as mentioned before, pilot 56p is presently vented to exhaust. Now, cylinder rod 57a extends to release the hand restraints. It will be noted that such extension can occur only when the failsafe circuit constituted by valves 76 and 77 senses that safety block 119 is in the safety position. Thus, only after all moving elements on the machine have stopped, including safety block 119, it is possible for the hand restraints to release.

When the member 126 is fully extended, valves 54 and 83 are actuated to supply air to all components which connect commonly with line 203. Hence, valve 58 operates to the return position and air is supplied to inlet 60a, inlet 78a and inlet 82a. Shifting of valve 58 to the return position permits air from valve 67 to be supplied to inlet 65a of valve 65 but since 65 is closed, the air is transmitted no further.

Since valve 78 was closed by member 126 when the hand restraints were retracted, it will be observed that air to valves 80 and 84 is blocked. Accordingly, if the operator is still actuating foot pedal valve 60 at the conclusion of the cycle of the safety mechanism, piston 81p cannot be displaced downwardly within cylinder 81 to actuate valves 80 and 84. Hence, cylinder rod 57a is prevented from retracting. The non-repeat circuit thereby prevents a subsequent cycling from occurring. The only way for a subsequent cycle to occur is if the operator releases valve 60 after valves 54 and 56 have been actuated. When this is done, piston 81p is displaced upwardly within cylinder 81 to actuate both valves 82 and 85. The air being supplied from valve 83 to valve 82 is now transmitted through valves 82 and 85 to pilot 78r of valve 78, thereby shifting this latter valve to the return position. In the return position, valve 78 opens to supply air to inlet 80a of valve 80. However, since piston 81p is now at its upper position, valves 80 and 84 are released and the signal to valve 56 for extending cylinder rod 57a can be transmitted through valves 80 and 84 only by actuating valve 60 to move piston 81p downwardly within cylinder 81. Thus, the non-repeat feature provides particularly advantageous operation in preventing a subsequent cycle should the foot pedal 6C be depressed at the conclusion of an operating cycle. However, it will be noted that even if a subsequent cycle were to accidentally occur for any reason whatsoever, the hand restraint safety would still withdraw the operator's hand from the machine before element 102a and block 119 were operated.

The emergency release circuit mentioned earlier comprises valve 70, valve 71, and valve 72. Basically, the emergency release circuit permits the hand restraints to be returned to their released position if for any reason one or both of the cables 116, 118 become fouled or snagged thereby preventing safety mechanism from being operated to the restraining position. With valves 72 and 70 in their non-actuated positions, valve 71, when actuated, conducts air from line L via line 218 through valve 70 and then via line 219 through valve 72 and then via line 220 to inlet 62b of shuttle valve 62. In turn, valve 56 is operated by pilot 56r to its return position. Since actuation of valve 71 will customarily occur only when cylinder rod 57a is being retracted, valve 56 is always shiftable to the return position because pilot 56p vents to exhaust upon release of foot pedal valve 60. With valve 56 thus shifted to the return position, the travel of cylinder rod 57a is immediately reversed to operate the safety mechanism to the released position. The fouled cable(s) may then be cleared.

Valve 72 also provides a failsafe feature which disables the emergency release circuit when the safety mechanism is in the restraining position. Because the connection between lines 219 and 220 is broken when valve member 72 is displaced by valve member 162, valve 56 cannot be shifted to the return position with the safety mechanism in the restraining position. Since valve 70 is actuated just prior to actuation of valve 65, the emergency release circuit is disabled just prior to the transmission of the signal from valve 66 to valve 73. Thus it is impossible for the hand restraints to be released by the emergency release circuit after movement of safety block 119 has commenced.

Figures 13, 14:
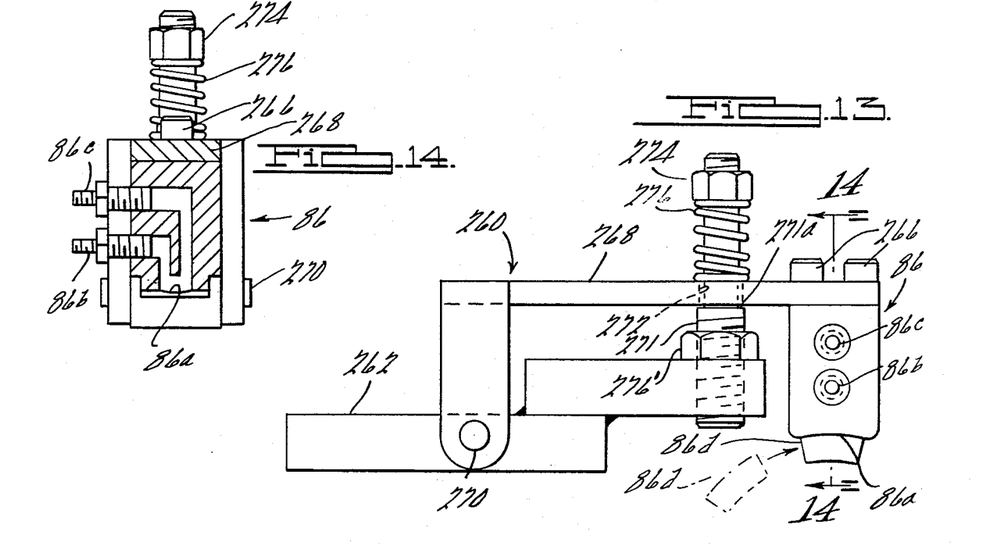
FIG. 13 is a side elevational view of one of the failsafe valves which is used in the pneumatic control circuit of FIGS. 11 and 12.
FIG. 14 is a sectional view taken along line 14—14 in FIG. 13.

Having described the overall operation of the safety mechanism, attention is now directed to the remaining drawing figures which illustrate specific details of failsafe valves which may be advantageously used in the system. FIGS. 13 and 14 illustrate specific details of valve 86 which is utilized in FIG. 12. Ports 86b and 86c are in the form of nipple fittings threaded into respective bores in the body of the valve. These valve body bores open into the common bore 86a which is open at the lower concavely curved surface of the valve body. When bore 86a is closed by a closure element such as element 86d (shown in FIG. 13 only), a fluid circuit path is completed between ports 86b and 86c. As mentioned earlier in FIG. 12, valve 86 is arranged for actuation in timed relation with the stroke of machine element 102a and as particularly illustrated by way of example in FIG. 12, via a cam operatively coupled with cam 190. Thus, in FIG. 13, element 86d constitutes a cam arranged for rotation with cam 190 to selectively close bore 86a; more specifically, element 86d is arranged for rotary, tangential movement, relative to the lower curved surface of the valve body as indicated by the arrow in FIG. 13. Excellent closure of member 86d with the valve body around bore 86a is attained via the mounting structure 260 for mounting valve 86. Mounting structure 260 comprises a base 262 which is disposed adjacent the rotary path of element 86d. Valve 86 is affixed by a pair of bolts 266 to one end of an arm structure 268 whose opposite end is hinged on base 262 as at 270. Arm 268 is biased in the clockwise direction about hinge 270 to thereby bias valve 86 generally radially inwardly of the axis about which element 86d rotates. This biasing arrangement is provided by a stud 271 which extends upwardly from base 262 passing through a hole 272 in arm 268. A nut 274 is threaded onto the upper end of stud 271 and a helical spring 276 is compressed between nut 274 and arm 268 to thereby urge arm against a shoulder 271a on stud 271. The compression force in spring 276 may be varied by adjusting nut 274 on stud 271, and the radial position to which valve 86 is biased relative to element 86d may be adjusted by vertically adjusting stud 271 on base 262. A nut 276' locks stud 271 on base 262. With this arrangement, valve 68 is normally biased to a position wherein the radially inner (or lower as viewed in the drawings) end thereof is positioned to be in the path of travel of element 86d. In this way, when element 86d approaches valve 86, it will first abut the valve body thereby camming the latter slightly radially outwardly against the force of spring 276. When element 86d stops at the solid line position of FIG. 13, it closes valve bore 86a and spring 276 exerts a closure force between the two whereby effective sealing and tight closure are attained. When element 86d begins to rotate at the beginning of the next operating stroke of machine 102, it releases the valve, thereby opening bore 86a.

Figures 15, 16:
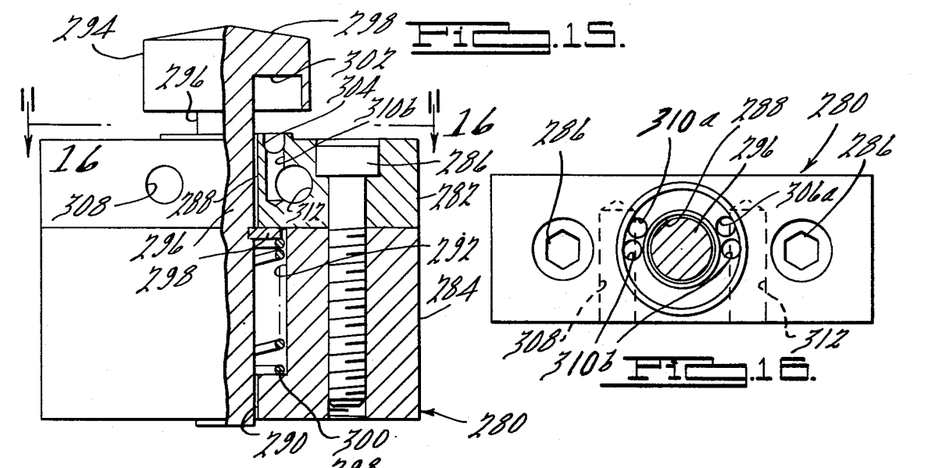
FIG. 15 is a longitudinal half sectional view of another form of valve.
FIG. 16 is a transverse sectional view taken along line 16—16 in FIG. 15.

FIGS. 15 and 16 disclose a further embodiment of failsafe valve identified by the numeral 280. Valve 280 comprises a twopiece body formed by solid rectangular body elements 282 and 284 fastened together by a pair of bolts 286. A central circular bore 288 extends through body element 282 and aligns with a bore 290 in body element 284, the upper end of which is counterbored as at 292. A valving member 294 comprising a cylindrical stem 296 and an enlarged cylindrical head 298 has the stem 296 passing through bore 288, counterbore 292 and bore 290. An annular retaining element 298 is affixed to stem 296 within counterbore 292. A helical compression spring 300 is disposed within counterbore 292 around stem 296. The lower end of spring 300 bears against the shoulder between bore 290 and counterbore 292 and the upper end of spring 300 bears against retaining ring 298 to urge the ring against the lower surface of body element 282 around bore 288. Hence, spring 300 biases valving member 294 upwardly relative to the valve body so that head 298 is normally spaced from the top surface of body element 282. Head 298 is a solid but has an annular groove 302 fashioned in the underside thereof around stem 296. An annular groove 304 is fashioned in the top surface of body element 282 around and slightly outwardly from bore 288. A pair of passages 306a, 306b extend downwardly from the bottom of groove 304 at one side of bore 288 to intercept a perpendicular bore 308 extending into the body element 282 from the front surface thereof. Another pair of bores 310a and 310b extend downwardly from the bottom of groove 304 at the opposite side of bore to intercept a perpendicular bore 312 extending into body element 282 from the front surface thereof. In the illustrated position of FIG. 15, a pneumatic signal entering one of the bores 308, 312 simply vents to exhaust; however, when valving member 294 is displaced downwardly to seat head 298 against the top surface of the valve body, groove 302 in cooperation with groove 304 provides communication between the two bores, 308 and 312, whereby the pneumatic signal can be transmitted between the two bores 308, 312 via bores 306a, 306b, grooves 302, 304 and bores 310a, 310b. Thus, it can be seen that valve 280 provides the failsafe operation described earlier in connection with the system of the present invention.

Figures 17, 18:
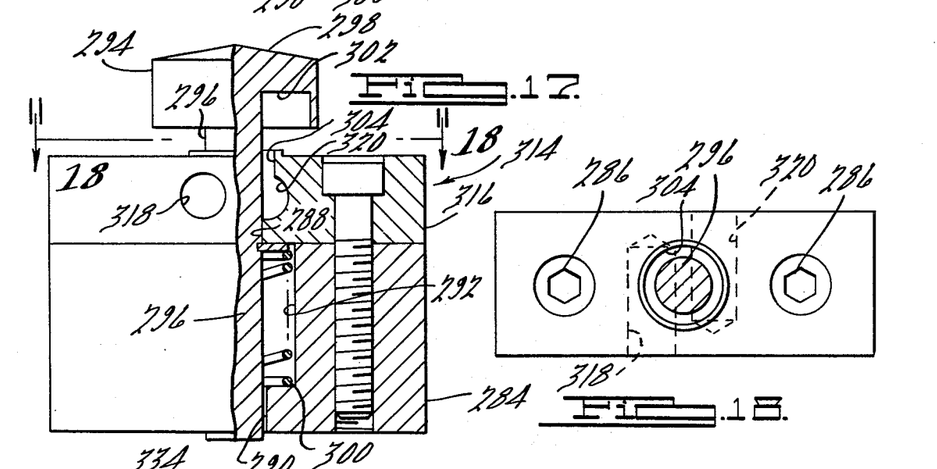
FIG. 17 is a longitudinal half sectional view of another form of valve.
FIG. 18 is a transverse sectional view taken along line 18—18 in FIG. 17.

FIGS. 17 and 18 disclose another valve 314 which is generally similar to valve 280. Accordingly, like elements from FIGS. 15 and 16 are retained in FIGS. 17 and 18 and only those elements which are different need be described. The difference between valves 280 and 314 is that in valve 314, a body element 316 replaces body element 282. Body element 316 comprises a deeper annular groove 304 which intersects a pair of parallel bores 318, 320 extending into body element 316 from opposite sides thereof on diametrically opposite sides of bore 288. When valving member 294 is displaced downwardly to close head 298 on the top surface of body member 316, a fluidic signal may be conducted between bores 318 and 320 via grooves 304 and 302. Thus, it will be perceived valve 314 operates in the same fashion as valve 280 to attain the desired failsafe operation.

Figures 19, 20, 21:
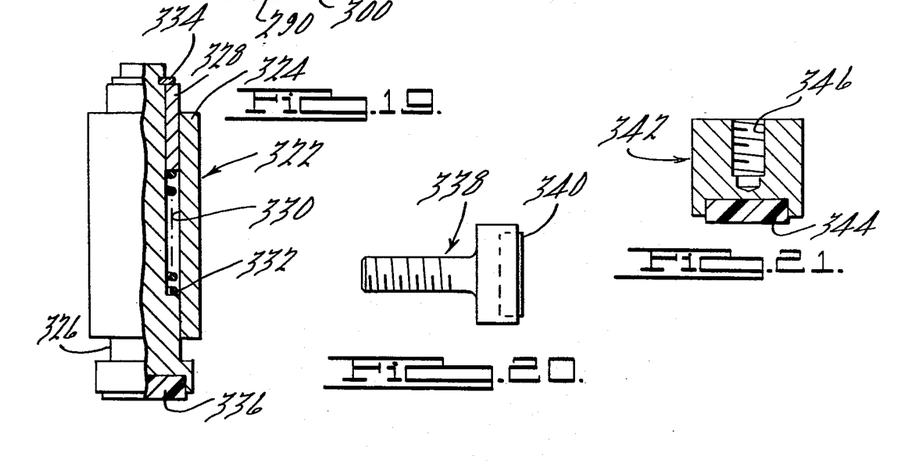
FIG. 19 is a longitudinal half sectional view of a valve actuator.
FIG. 20 is a longitudinal view of another actuator.
FIG. 21 is a longitudinal sectional view of yet another actuator.

FIGS. 19, 20 and 21 disclose different forms of actuators for failsafe valves. Turning first to FIG. 19, the actuator 322 shown therein comprises a tubular body 324 within which a cylindrical actuating element 326 is arranged for axial displacement. A tubular bushing 328 is pressed into the upper end of the bore of body 324 and a helical spring 330 is disposed around element 326 between the lower end of bushing 328 and a shoulder 332 of element 326. With this arrangement, element 326 is biased downwardly relative to body 324 with downward movement of element 326 limited by a retaining ring 334 on the upper end thereof which bears against the upper end of bushing 328. The lower, or head, end of element 326 comprises a circular plastic sealing disk 336 inserted into a circular recess in the lower surface of member 326 and is adapted to seal against the open bore of a failsafe body such as the bore 166 in FIGS. 7–10. Actuator 322 is particularly useful in that it does not require the more complicated biasing arrangement such as that of valve 66 since the yieldable mounting is internally contained. Thus, in usage, body 324 may be affixed to the movable mechanism element whose position the failsafe valve is to sense; the actuator element 326 can be displaced to accommodate the final increment of travel of the moving mechanism element.

FIG. 20 illustrates an actuator 338 in the form of a stud which may be threaded into a hole in the movable mechanism element whose position the failsafe valve is to sense. Actuator 338 has a plastic sealing disk 340 in the head end thereof. The threaded mounting of actuator 338 permits adjustment thereof relative to the failsafe valve body.

FIG. 21 illustrates a further form of actuator 342 having a circular sealing disk 344 at the lower end thereof. The upper end thereof has a threaded bore 346 via which the actuator may be mounted to the movable mechanism element whose position the failsafe valve is to sense. The threaded bore 346 permits convenient adjustment of the actuator relative to the failsafe valve body.

It is to be understood that the foregoing description is that of a preferred embodiment of the invention. Various changes and modifications may be made without departing from the spirit and scope of the invention as defined by the appended claims.

I claim:

1. A failsafe valve means for use in a safety apparatus or the like for determining when two components of the apparatus are in a predetermined relationship and providing a control signal in response to such predetermined relationship, comprising a valve body fixed relative to a first of said components, a first passage formed in said valve body and terminating at one end in a first port normally communicating with the atmosphere, the other end of said first passage being in communication with a source of pneumatic pressure, a second passage formed in said valve body and terminating at one end in a second port normally communicating with the atmosphere, the other end of said second passage being in communication with a device adapted to receive pneumatic pressure when the two components are in the predetermined relationship and a valving member supported for movement relative to said valve body between a closed position and an opened position, the movement of said valving member between the positions being controlled by the other of said components, said valving member being adapted, when in its closed position, to terminate the communication of said ports with the atmosphere and to provide a flow path between said ports for establishing a pneumatic circuit between said first passage and said second passage and permitting the transmission of said control signal from said first passage to said second passage.

2. A failsafe valve means as set forth in claim 1 further including a bore extending into said valve body from a surface thereof in communication with the atmosphere; said first passage intersecting said bore at said first port; said second passage intersecting said bore at said second port; said valving member cooperable with said body surface around said bore to open and close said bore from communication with the atmosphere.

3. The failsafe valve means of claim 2 wherein said valving member is movably mounted on said body.

4. The failsafe valve means of claim 3 wherein said valving member comprises a stem guided within a guide bore in said body and a head on said stem arranged to close against said surface around said bore.

5. The failsafe valve means of claim 4 wherein said guide bore is cylindrical in shape and said body bore is annular in shape and disposed around said guide bore.

6. The failsafe valve means of claim 5 wherein said head of said valving member has an annular groove in the surface thereof facing said body bore arranged to cooperate with said annular body bore when said head is closed on said body surface around said body bore.

7. The failsafe valve means of claim 2 wherein said valving member is arranged for transverse movement relative to said body surface to close said bore.

8. The failsafe valve means of claim 7 wherein said valving member is arranged for rotary movement about an axis spaced radially inwardly from said valve body, said body surface facing radially inwardly toward said axis.

9. The failsafe valve means of claim 8 wherein said radially inwardly facing surface of said body is curved to approximate the curvature of the path of travel of said valving member.

10. The failsafe valve means of claim 9 wherein said valve body is yieldably biased toward the radially inwardly direction.

* * * * *